(12) United States Patent
Chen et al.

(10) Patent No.: US 11,526,787 B1
(45) Date of Patent: Dec. 13, 2022

(54) KNOWLEDGE INFERENCE ENGINE SYSTEM AND METHOD OF IMPLEMENTATION

(71) Applicant: Shanghai Jiao Tong University, Shanghai (CN)

(72) Inventors: Cailian Chen, Shanghai (CN); Qimin Xu, Shanghai (CN); Shouliang Wang, Shanghai (CN); Shanying Zhu, Shanghai (CN); Lei Xu, Shanghai (CN); Xinping Guan, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 17/842,917

(22) Filed: Jun. 17, 2022

(30) Foreign Application Priority Data

Jun. 18, 2021 (CN) .......................... 202110678308.1

(51) Int. Cl.
 *G06N 5/04* (2006.01)
 *G06N 5/02* (2006.01)

(52) U.S. Cl.
 CPC .............. *G06N 5/04* (2013.01); *G06N 5/022* (2013.01)

(58) Field of Classification Search
 None
 See application file for complete search history.

(56) References Cited

FOREIGN PATENT DOCUMENTS

| CN | 111049667 A | 4/2020 |
| CN | 111740924 A | 10/2020 |

OTHER PUBLICATIONS

Liu, et al., An Efficient Scheduling Algorithm for Adjustable Time Slots in Time-Triggered Ethernet, 2019 IEEE 11th International Conference on Communication Software and Networks, 2019, pp. 68-72 (Year: 2019).*

* cited by examiner

*Primary Examiner* — Wilbert L Starks
(74) *Attorney, Agent, or Firm* — Blank Rome LLP (57) ABSTRACT

The present invention discloses a knowledge inference engine system and a method of implementation, relating to the field of wired communication networking technology. The system includes a data generation module, a stream partitioning model, an offline scheduling module, an online scheduling module, a scheduling solution base and a historical information base module, the data generation module used to generate a dataset and divide it into a plurality of partitions, the stream partitioning model used to partition the dataset, the offline scheduling module used to generate a scheduling solution for static network requirements, the online scheduling module used to rapidly generate a scheduling solution for a new TT stream, the scheduling solution base used to store a result of the partitioning, an iterative scheduling order for the partitions and the offline scheduling solution, the historical information base used to update and store relevant data information and performance indicators. The method of implementation proposed in the present invention combines and collaboratively operates offline iterative partition scheduling and an online incremental backtracking algorithm, addressing the problem that existing deterministic scheduling methods cannot simultaneously ensure scalability and schedulability.

9 Claims, 4 Drawing Sheets

KNOWLEDGE INFERENCE ENGINE SYSTEM AND METHOD OF IMPLEMENTATION

RELATED APPLICATION

This application claims priority to Chinese Application No. 202110678308.1, filed on Jun. 18, 2021. The entire content of this application is incorporated herein by reference.

FIELD OF THE INVENTION

The present invention relates to the field of wired communication networking technology, and particularly to a knowledge inference engine system and a method of implementation.

DESCRIPTION OF THE PRIOR ART

With the rapid development and progress of artificial intelligence (AI) and internet of things (IoT) technologies, a new IoT architecture, called collaborative IoT (AIoT), has been widely used in various application fields such as industrial automation and vehicle networking. However, this collaborative AIoT is faced with a significant challenge to meet the high bandwidth demands of massive IoT data and guarantee deterministic and real-time transmission for time-sensitive applications. Therefore, communication networking with deterministic guarantees and high-bandwidth services is a key requisite for collaborative intelligent networking. Traditional deterministic communication networking is based on low-bandwidth fieldbuses, such as FTT-CAN, FlexRay, etc., and cannot satisfy the high bandwidth demands. Ethernet is a standard networking mechanism supporting high bandwidth, which, despite a high transmission rate, cannot provide deterministic and real-time guarantees.

In order to enhance the determinism and real-time characteristics of IEEE 802.1 Ethernet, the IEEE 802.1 TSN task group developed time-sensitive networking (TSN). Specifically, IEEE 802.1Qbv specifies a programmable gating mechanism, called time-aware shaper (TAS), which, through enabling and disabling egress ports of queues, is based on a predefined periodic schedule (i.e., Gate Control List, GCL) to transmit time-triggered (TT) streams, audio/video bridging (AVB) streams and best effort (BE) streams. Unlike BE streams with no timing guarantees and AVB streams with bounded end-to-end delay requirements, TT streams need to satisfy the stringent latency and jitter requirements. Although the TSN standard specifies the time transmission gating behavior, additional scheduling configurations are needed to achieve deterministic delay and bounded jitter of TT streams. For the issue of scheduling for deterministic real-time transmission with TT streams in a TSN network, most works utilize modeling methods such as satisfiability modulo theories (SMT) and integer linear programming (ILP) to guarantee the deterministic and real-time transmission behavior of TT streams. However, these works ignore route planning for TT streams, strictly restricting the schedulability space. Some works trade at the expense of high execution time for schedulability. Such works are only suitable for small and medium-sized networks and not applicable to large-scale networks. Some information about historical scheduling solutions in a network system is very helpful for the improvement of the network's performance and scheduling solution generation. Therefore, full and effective utilization of historical schedule information for knowledge inference can help tackle challenges in large-scale TSN scheduling.

Additionally, although the random stream partitioning (RSP) approach solves the problem of low schedulability solution space, this approach does not take into account relevance between individual data streams in a TSN network. If potential conflict and inter-dependency relationships between streams are ignored, the schedulability of traffic will be directly affected. Therefore, designing a real-time, deterministic schedule which not only takes inter-stream relationships into account but also guarantees schedulability and scalability in TSN is a very challenging problem.

In addition, since TSN is open networking, the networking requirements and topologies vary among actual sites, necessitating rapid schedule generation for reducing the impact of time cost of the generation process on the quality of service. How to design an online scheduling scheme featuring rapid generation is a critical problem requiring urgent solution.

As found in a search of existing literature, the closest implementation is Chinese Patent Application No. 201911006763.6, entitled "Offline Scheduling Optimization Scheme for Time-Triggered Ethernet (TTE) Communication Tasks", which, specifically, transforms a communication task scheduling problem into a data frame permutation problem in a two-dimensional space made up of link resources and time, fixing the data frame transmission process, simplifying the restrictions such as transmission delay constraints, timing constraints and link conflict constraints and reducing the difficulty of solving the optimization problem. However, this method does not take into account inter-stream dependency relationships and the variation of networking requirements, but only fixes the network topology and data transmission routing in order to more rapidly obtain an offline scheduling solution. Patent Application No. 202010741539.8, entitled "Method for Traffic Shaping and Route Plan Scheduling for TSN Gating Mechanism" specifically, based on the GCL design for TT queues and GCL cycle idle time duration programming, generates GCLs for egress queues at individual switch ports, generates an optimal joint scheduling solution based on a data route set, generates configuration files for switch ports and terminal devices using associated configuration software, and configures them at the individual switches and terminal devices. However, this method adopts a global dataset scheduling scheme, lacks schedule scalability and is difficult to use in large-scale industrial networks. Moreover, this method does not take into account inter-stream dependency relationships, and further improvement would be desirable in terms of solvability of schedulability.

Therefore, those skilled in the art are directing their effort toward developing a system and method that can solve all the above problems.

SUMMARY OF THE INVENTION

In view of the above described shortcomings of the prior art, the technical problem to be solved by the present invention lies in: how to obtain relevance between TT streams from the degrees of conflicts and dependencies between the TT streams and find an in-TSN TT stream partitioning model according to a stream relevance metric, thereby improving the schedulability solution space while enhancing the scalability; how to design a knowledge inference engine, which learns data streams' own attributes and historical schedule information to improve network scheduling performance while presenting higher schedulability to large-scale networks; and how to design an online scheduling scheme which, when faced with variations in TSN network topology and requirements, can utilize pre-existing offline scheduling tasks and choose, using a partitioning model, a schedule for some appropriate old TT streams for fine tuning, thus achieving rapid scheduling solution generation while expanding the schedulability solution space as much as possible.

To achieve the above objects, the present invention provides a knowledge inference engine system characterized in comprising a data generation module, a stream partitioning model, an offline scheduling module, an online scheduling module, a scheduling solution base and a historical information base module;

the data generation module used to generate a large unlabeled dataset and a small labeled dataset and equally divide the datasets into a plurality of partitions;

the stream partitioning model used to, upon receipt of the datasets, based on a stream relevance metric value obtained from knowledge inference, partition the datasets;

the offline scheduling module used to generate a scheduling solution for static network requirements;

the online scheduling module used to, when in time-sensitive networking, there is newly-added traffic, through reasonably adjusting an old stream scheduling solution, rapidly generate a scheduling solution for a new TT stream;

the scheduling solution base used to store the partitioning results and an iterative scheduling order for the individual partitions, store the offline scheduling solution, and enable, when there is newly-added traffic, the online scheduling module to immediately use the offline scheduling solution;

the historical information base used to, based on a historical scheduling solution and the partitioning results in the scheduling solution base, update and store relevant data stream attributes, a scheduling label, a partitioning label and like data information and delay, jitter, cycle period and like performance indicators;

Further, the stream partitioning model comprises a preprocessing unit, a learning unit and a partitioning unit;

the preprocessing unit used to normalize the labeled and unlabeled datasets and establish dependency relationships between data streams;

the learning unit used to conduct unsupervised learning, semi-supervised training and priori knowledge computation on the datasets, obtaining a relevance metric between the data streams;

the partitioning unit used to, based on the relevance, partition the data streams.

Further, the learning unit, through unsupervised learning and semi-supervised collaborative training on the datasets, infers conflict relationships between the TT streams, thereby obtaining a data driving-based relevance metric between the TT streams, and, from time slot occupancy, the number of shared end systems and the inter-stream dependency relationships, calculates a relevance metric based on priori stream attributes.

A method of implementing a knowledge inference engine is characterized in that the method comprises the steps as follows:

Step 1: Input a dataset to be scheduled, and by a data generation module, import information from a historical information base, according to requirements of a practical application, generate a stream characterization dataset consisting of different scheduling instances, label schedulable ones of the scheduling instances and equally divide the stream characterization dataset into a plurality of partitions;

Step 2: By a stream partitioning model, upon receipt of the dataset from the data generation module, from knowledge inference, obtain the partitioning results of the dataset.

Step 3: Import the partitioning results to an offline scheduling module, store them in the historical information base, and in an offline scheduling phase, construct an offline scheduling constraint set for each partition, construct an iterative scheduling algorithm and output an offline scheduling solution.

Step 4: From the output offline scheduling solution, using associated configuration software, generate configuration files for switch ports and terminal devices, configure them at the individual switches and terminal devices, and store the offline scheduling results in a scheduling solution base.

Step 5: When in the time-sensitive networking, the networking requirements experience a dynamic change, i.e., there is a new scheduling instance being input, by an online scheduling module, import the partitioning results and the offline scheduling results from the scheduling solution base, according to the stream partitioning model, identify the partition to which the newly-added TT stream belongs, construct a dynamic scheduling constraint set, design a heuristic algorithm, conduct incremental scheduling on the newly-added TT stream on the basis of the previous scheduling solution, if there is no feasible scheduling solution, identify old TT streams belonging to the same partition as the newly-added TT stream, adjust their scheduling solution until a feasible solution is obtained, and output the online scheduling solution.

Step 6: From the output online scheduling solution, using associated configuration software, generate configuration files for the switch ports and the terminal devices, configure them at the individual switches and terminal devices, store the online scheduling results in the scheduling solution base, by the scheduling solution base, import all the scheduling result information to the historical information base and update it.

Further, each of the scheduling instances in the dataset generated in Step 1 possesses a stream with different attributes and an inter-stream dependence graph.

Further, in the partitioning process in Step 2, the higher stream relevance between TT streams, the higher a probability of occurrence of conflicts and dependencies, and the more they tend to be divided into the same partition.

Further, the iterative scheduling algorithm in Step 3 constructs an inter-stream dependency constraint that, assuming there is one child task and one father task in a network, a TT stream of the child task has to be sent in dependence on a TT stream of the father task and an injection time of the child task has to be started only when the father task has arrived, depicting inter-stream dependency characteristics.

Further, the iterative scheduling algorithm in Step 3 constructs an inter-partition scheduling constraint that, according to an iterative scheduling order that has been assigned during the partitioning of the dataset, each partition undergoes, on a basis of partition(s) for which scheduling has been previously completed, scheduling solution generation, improving scheduling scalability.

Further, the online scheduling phase in Step 5 utilizes the offline scheduling results and the offline scheduling solution.

Further, the online scheduling solution in Step 5 employs incremental scheduling for newly-added traffic.

Compared with the prior art, the present invention has the following beneficial effects:

1. For conflict and dependency relationships between different TT streams, the present invention, through combining a data-driven relevance metric and a priori knowledge relevance metric, constructs a learning-based stream partitioning model, which, through calculating the relationships between the TT streams, greatly improves the system's schedulability solution space.

2. The present invention uses a stream partitioning model to partition TT streams and designs an iterative scheduling algorithm for TT streams in each partition. Compared to the global scheduling scheme that involves designing for each TT stream, this greatly reduces computational complexity, thereby enhancing scalability, and is suitable for use in large-scale network scenarios.

3. The present invention carries out knowledge inference based on the system's historical scheduling solutions and trains the dataset partitioning process, further guaranteeing deterministic transmission of TT streams. Moreover, network performance of the system in terms of delay, jitter, packet loss and the like is optimized.

4. The present invention, based on a scheduling solution in the offline part and the partitioning results of the stream partitioning model, through employing a heuristic strategy, designs an online incremental backtracking scheduling algorithm, which, in the event of a change in the network system from newly-added traffic, can rapidly generate a feasible scheduling solution.

Below, the concept, structural details and resulting technical effects of the present invention will be further described with reference to the accompanying drawings to provide a full understanding of the objects, features and effects of the invention.

DETAILED DESCRIPTION OF THE PREFERRED EMBODIMENTS

Below, the accompanying drawings of this specification are referenced to introduce many preferred embodiments of the present invention so that the techniques thereof become more apparent and readily understood. The present invention may be embodied in many different forms of embodiment, and the protection scope of the invention is not limited only to the embodiments mentioned herein.

Throughout the accompanying drawings, structurally identical parts are indicated with identical reference numerals, and structurally or functionally similar components are indicated with similar reference numerals. The size and thickness of each component in the drawings are arbitrarily depicted, and the present invention is not limited to any size or thickness of each component. For greater clarity of illustration, the thicknesses of some parts are exaggerated as appropriate somewhere in the drawings.

Step 1: Each scheduling instance uses different stream attributes and inter-stream dependence graphs for scheduling of different real-time applications. Attributes of each stream include period, frame length, deadline date, number of queues, frame size, sender, recipient and internal number. Ranges of stream attributes in a dataset are shown in Table 1. The internal number describes whether a steam is an internal stream. A random stream partitioning (RSP) method is employed to equally divide TT streams of scheduling instances into multiple partitions, and at the same time, historical scheduling solutions of the network system are imported. Schedulable ones of the scheduling instances are added with a label representative of the schedulability. A large amount of unlabeled data and a small amount of labeled data will be generated.

| Attribute Name | Attribute Range |
|---|---|
| Period | {600, 1000, 1500, 2000, 3000, 6000} µs |
| Frame size | {1, 2, 3, 4, 5, 6, 7, 8, 9, 10, 11, 12} × 128 bytes |
| End-to-end deadline time | {0.5, 1} × period |
| Number of Frames | {2, 3, 4} |
| Number of queues | {3, 4} |
| Sender/recipient | {ES1, ES2, . . . , ES7} |
| Internal stream number | {−1, 1} |
| Stream dependence number | {1, . . . , 10} |

Step 2: Based on the large amount of unlabeled data and the small amount of labeled data generated in Step 1, a sparse autoencoder (SAE) is utilized to conduct semi-supervised learning on the data streams, and a naive Bayesian classifier with the priori Gaussian distribution is added in the top layer of the SAE encoder. A low-rank representation representative of the attributes of each data stream can be obtained, with difference norms D1 of the low-rank representation values between TT streams representing a data-driven stream relevance metric. Next, in accordance with that time slot occupancy is expressed by the frame size and period of a TT stream, conflict relationships between the TT streams can be described by the time slot occupancies and the number of devices at a shared end of the TT streams. D2 obtained from the conflict relationships and dependency relationships between TT streams represents a stream relevance metric for priori knowledge. From both D1 and D2, stream relevance between the TT streams is obtained.

Figure 1:
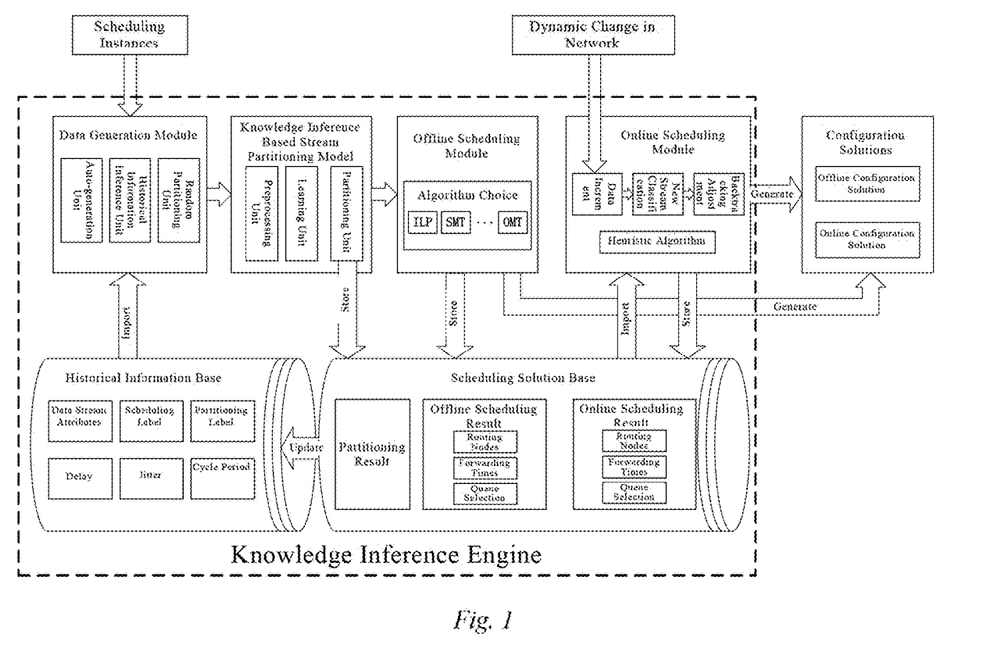
FIG. 1 is an architectural diagram of a scheduling process in a preferred embodiment of the present invention.
Figure 2:
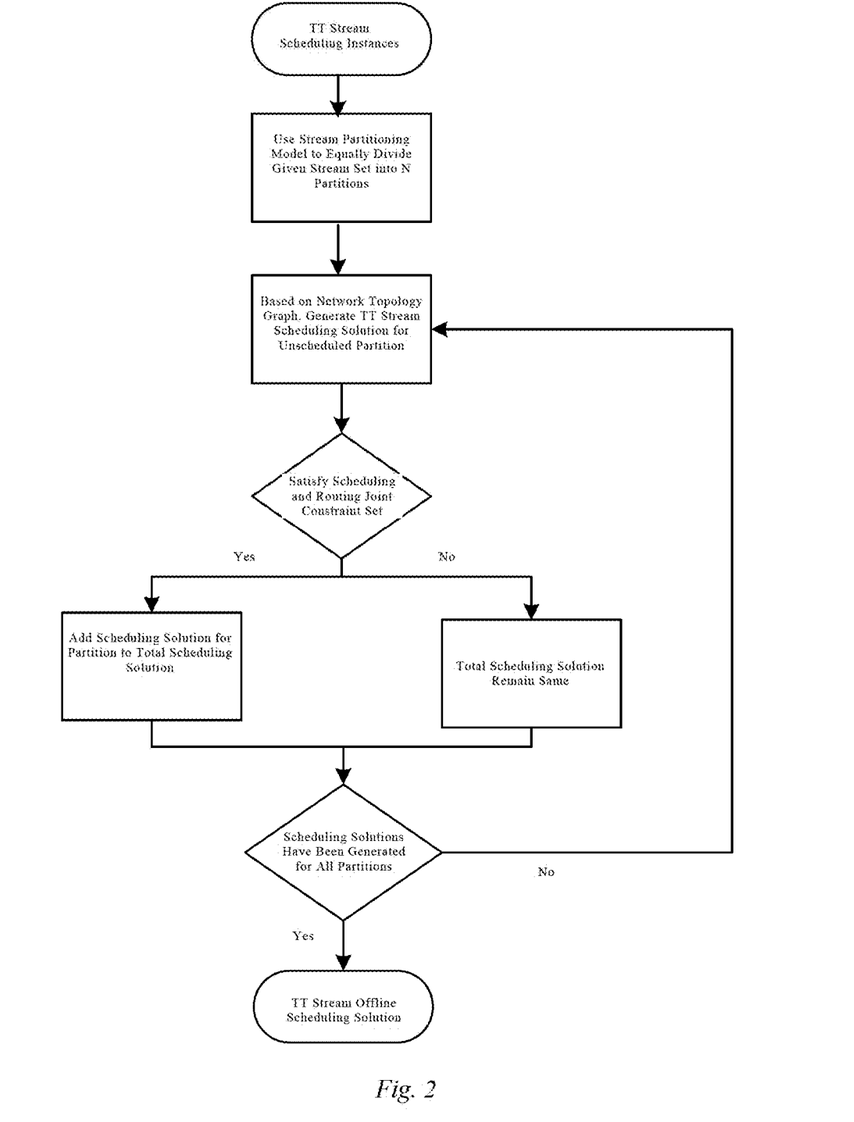
FIG. 2 is a flowchart of offline scheduling in a preferred embodiment of the present invention.

Step 3: Based on the stream relevance metric, a graph-based clustering method is used to partition the TT streams. A stream partitioning model is first modeled as an undirected graph where each node represents a stream and each link between two nodes represents a metric of association between the two TT streams. A min-cut algorithm is introduced, which utilizes a normalized cut framework to generate the sizes of coalescing partitions. Modules and relevant functions in the stream partitioning model are as shown in FIG. 2.

Step 4: The stream partitioning model obtained in Step 3 divides a given set of incoming TT streams into N subsets S1, S2, SN, and scheduling and routing co-design constraints are established for the individual partitions for satisfying the determinism, real-time and inter-stream dependency requirements. Key constraints therein are specifically:

Transmission real-time constraints: End-to-end transmission latency of external TT streams (with different end systems) needs to be less than the transmission deadline $\alpha_i$ to satisfy the following formula:

$$t^{ot}_{i,N_i^{rp}-1} - t^{ot}_{i,1} + t^{t1}_i \leq a_i,$$

where $t_i^{tl}$ denotes a transmission time of a data frame of the i-th TC stream in a link, and $t_{i,1}^{ot}$ and $t_{i,N_i^{rp}-1}^{ot}$ represent time offsets of the first and last transmission links of the streams, respectively.

Conflict avoidance constraint: TC data frames with overlapping communication transmission paths are required to satisfy the following formulae to eliminate non-deterministic transmission caused by conflicts between the TC data frames:

$$(r_{i,k} \neq r_{\alpha,\gamma}) \vee (r_{i,k+1} \neq r_{\alpha,\gamma+1}) \vee$$
$$\left(t_{i,k}^{ot} + j^* p_i \geq t_{\alpha,\gamma}^{ot} + t_\alpha^{tl} + \beta^* p_\alpha\right) \vee$$
$$\left(t_{i,k}^{ot} + j^* p_i + t_i^{tl} \leq t_{\alpha,\beta,\gamma}^{ot} + \beta^* p_\alpha\right)$$

In the same link, there shall not be two frames with overlapping transmission windows in order to avoid inter-stream collision. P represents the period of a stream.

$$(r_{i,k+1} \neq r_{\alpha,\gamma+1}) \vee (r_{i,k+2} \neq r_{\alpha,\gamma+2}) \vee$$
$$(q_{i,k+1} \neq q_{\alpha,\gamma+1}) \wedge (1 \leq q_{i,k+1}, q_{\alpha,\gamma+1} \leq N^{qu}) \vee$$
$$\left(t_{i,k}^{ot} + j^* p_i \geq t_{\alpha,\gamma}^{ot} + t_\alpha^{tl} + \beta^* p_\alpha\right) \vee$$
$$\left(t_{i,k}^{ot} + j^* p_i + t_i^{tl} \leq t_{\alpha,\beta,\gamma}^{ot} + \beta^* p_\alpha\right)$$

If the frames of different TT streams are buffered in the same egress queue, the transmission windows in the last link must not overlap in the time domain in order to guarantee the deterministic behavior.

Stream dependency constraints: If one TT stream can only be transmitted in dependence on another TT stream, then the depended stream is referred to as a child task and the depending stream as a father task. The child task Si and the father task Sc shall satisfy the following formula:

$$(t_i^{ie} \geq t_f^{ie} + t_f^{ex} + t_f^{tr}) \wedge (t_i^{ie} + t_i^{ex} + t_i^{tr} \leq t_c^{ie})$$

where $t_i^{ie}$ represents an injection time of Si, and $t_i^{ex}$ and $t_i^{tr}$ represent an execution time and a transmission time of Si, respectively.

Stream Sequence Constraints: A physical property of stream transmission is that frames must follow the sequential order on the routing path. In order to avoid periodic disturbance between streams, the sum of the sending time in the last switch node and the transmission delay in the last link must be equal to or less than the period for each stream:

$$\left(t_{i,k+1}^{ot} > t_{i,k}^{ot} + t_i^{tl}\right) \wedge \left(t_{i,N_i^{rp}-1}^{ot} + t_i^{tl} \leq p_i\right)$$

Figure 3:
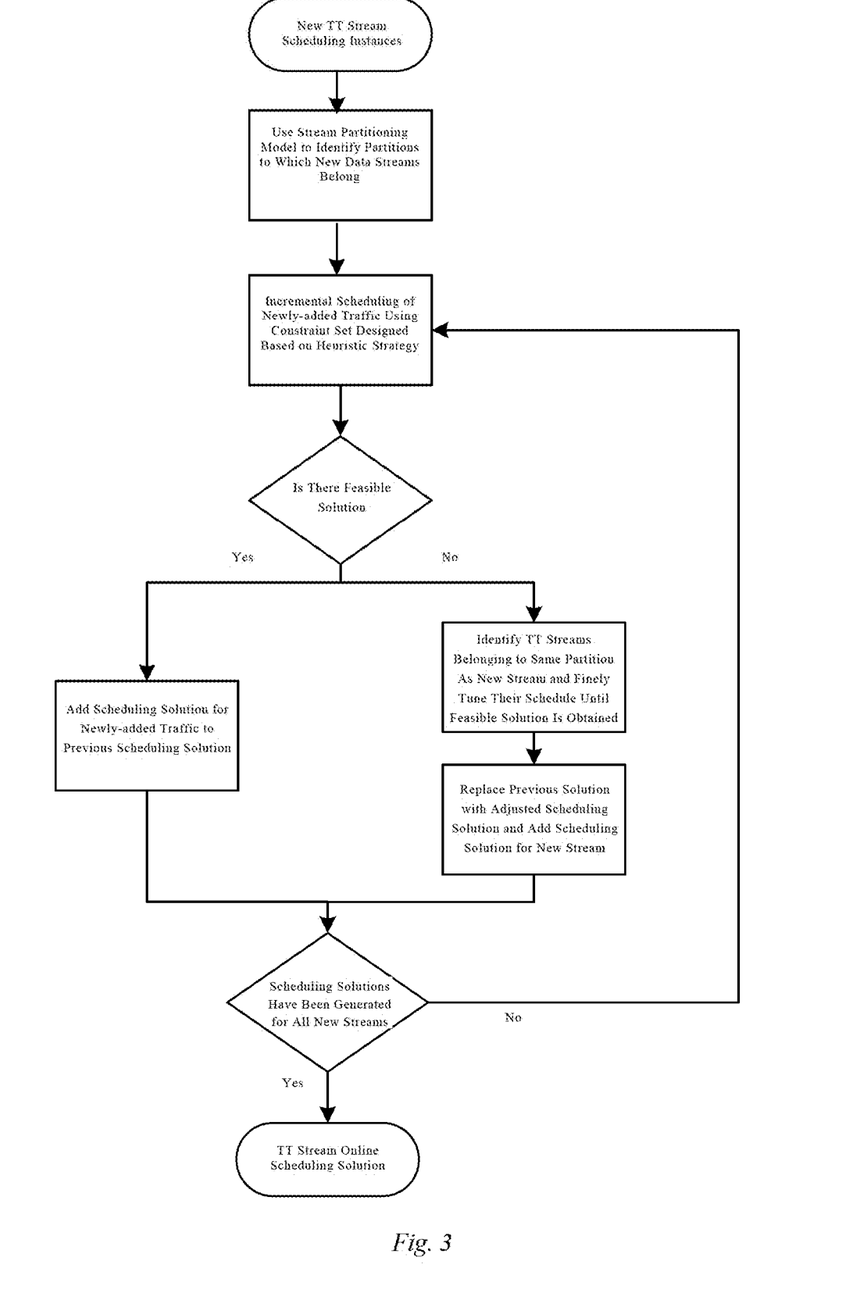
FIG. 3 is a flowchart of online scheduling in a preferred embodiment of the present invention.

Step 5: An offline iterative scheduling algorithm as shown in FIG. 3 is designed, and schedule sets and injection time sets for TT streams in the respective partitions are successively obtained according to an iterative order. Each iteration takes the previous schedule as a prior input to satisfy inter-stream dependency relationships and avoid conflicts between links. In accordance with the constraint set from Step 4, an optimal scheduling solution is designed for the dataset of each partition.

Step 6: In the event of an increase in the number of TT streams in the time-sensitive networking, a new scheduling instance is input, and the partition to which the newly added TT stream belongs is identified based on the stream partitioning model. In order to rapidly generate a schedule that meets the determinism and real-time requirements, a dynamic constraint set is constructed. Key constraints therein are specifically:

Time slot constraint: Each TT stream needs to be routed and is assigned with exactly one time slot:

$$\sum_{\forall j \in T} so_j = 1.$$

$so_j$ is representative of whether the j-th time slot is assigned to the specific TT stream. If so, $so_j$ takes 1. Otherwise, it takes zero.

Routing constraint: The route of a TT stream originates at the sending from a source host and ends at a destination host. In other words, the number of reachable destinations for a link passing through and outgoing from the source host is equal to the number of options for the next node of the stream. For the destination host, the number of the TT stream's links leading to it is 1. For the remaining nodes, the number of TT streams arriving through incoming paths is equal to the number of TT streams sent by outgoing paths.

$$\sum_{\forall i \in in(s)} dc_i = 0, \quad \sum_{\forall i \in out(s)} dc_i = |D|$$
$$\sum_{\forall i \in in(d)} dc_i = 1, \quad \sum_{\forall i \in out(d)} dc_i = 0 \; \forall \, n \in D$$
$$\sum_{\forall i \in in(n)} dc_i = \sum_{\forall i \in out(n)} dc_i \; \forall \, n \in V \setminus (\{s\} \cup D)$$

where $dc_i$ represents, if a TT stream is routed to a link i, the number of destinations that it can reach, in represents a path incoming to the node, out represents a path outgoing from the node, s represents the sender host, d represents the destination host, and n represents the remaining other nodes.

Conflict avoidance constraint: in any time slot, any network link will be occupied by at most one stream. If the i-th link has been occupied at the j-th time slot, scheduling is disallowed there.

$$a_{i,j} + es_{i,j} \leq 1 \; \forall i \in E, \forall j \in T$$

Figure 4:
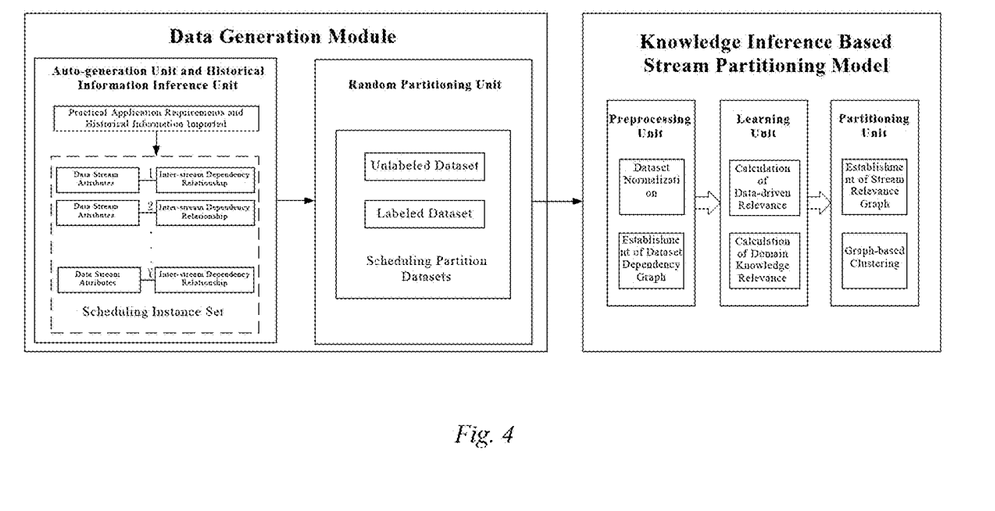
FIG. 4 is a schematic illustration of a stream generation and learning process in a preferred embodiment of the present invention.

Aiming at the minimization of the total number of links used for routing of the TT streams, incremental scheduling is conducted on the newly added TT stream on the basis of the previous scheduling solution. As shown in FIG. 4, if there is a scheduling solution, the scheduling solution for the new traffic is directly added to the previous scheduling solution. If there is no feasible scheduling solution, the previous TT streams of the same partition as the new TT stream are identified, and the scheduling solution for them is adjusted. If the result is still undesirable, the partition with the greatest conflict value is adjusted until a feasible solution is obtained.

Step 7: From the generated offline scheduling solution or online scheduling solution, configuration files for the individual switch ports and terminal devices are generated using some configuration software, and configured at the individual switches and terminal devices.

Preferred specific embodiments have been described in detail above. It should be understood that, those of ordinary skill in the art, without the need for creative effort, can make various modifications and changes, based on the concept of the present invention. Accordingly, all the technical solutions that can be obtained by those skilled in the art by logical analysis, inference or limited experimentation in accordance with the concept of the invention on the basis of the prior art are intended to fall within the protection scope as defined by the claims.

The invention claimed is:

1. A knowledge inference engine system, characterized in comprising a data generation module, a stream partitioning model, an offline scheduling module, an online scheduling module, a scheduling solution base and a historical information base module;

the data generation module used to generate a large unlabeled dataset and a small labeled dataset and equally divide the datasets into a plurality of partitions;

the stream partitioning model used to, upon receipt of the datasets, based on a stream relevance metric value obtained from knowledge inference, partition the datasets and calculate an iterative scheduling order for individual partitions;

the offline scheduling module used to generate a scheduling solution for static network requirements;

the online scheduling module used to, when in time-sensitive networking, there is newly-added traffic, through reasonably adjusting an old stream scheduling solution, rapidly generate a scheduling solution for a new TT stream;

the scheduling solution base used to store partitioning results and an iterative scheduling order for the individual partitions, store the offline scheduling solution and the online scheduling solution, and enable, when there is newly-added traffic, the online scheduling module to immediately invoke the offline scheduling solution as a basis for scheduling;

the historical information base used to, based on a historical scheduling solution and the partitioning results in the scheduling solution base, update and store relevant data stream attributes, a scheduling label, a partitioning label and like data information and delay, jitter, cycle period and like performance indicators;

the stream partitioning model comprising a preprocessing unit, a learning unit and a partitioning unit;

the preprocessing unit used to normalize the labeled and unlabeled datasets and establish dependency relationships between data streams;

the learning unit used to conduct unsupervised learning, semi-supervised training and priori knowledge computation on the datasets, obtaining a relevance metric between the data streams;

the partitioning unit used to, based on the relevance, partition the data streams.

2. The knowledge inference engine system as in claim 1, characterized in that the learning unit, through unsupervised learning and semi-supervised collaborative training on the datasets, infers conflict relationships between the TT streams, thereby obtaining a data driving-based relevance metric between the TT streams, and, from time slot occupancy, number of shared end systems and inter-stream dependency relationships, calculates a relevance metric based on priori stream attributes.

3. A method of implementing a knowledge inference engine, characterized in that the method comprises the steps of:

Step 1: inputting a dataset to be scheduled, and by a data generation module, importing information from a historical information base, according to requirements of a practical application, generating a stream characterization dataset consisting of different scheduling instances, labeling schedulable ones of the scheduling instances and equally dividing the stream characterization dataset into a plurality of partitions;

Step 2: by a stream partitioning model, upon receipt of the dataset from the data generation module, from knowledge inference, obtaining partitioning results of the dataset;

Step 3: importing the partitioning results to an offline scheduling module, storing them in the historical information base, and in an offline scheduling phase, constructing an offline scheduling constraint set for each partition, constructing an iterative scheduling algorithm and outputting an offline scheduling solution;

Step 4: from the offline scheduling solution which is output, using associated configuration software, generating configuration files for switch ports and terminal devices, configuring them at each of switches and terminal devices, and storing offline scheduling results in a scheduling solution base;

Step 5: when in the time-sensitive networking, the networking requirements experience a dynamic change, i.e., there is a new scheduling instance being input, by an online scheduling module, importing the partitioning results and the offline scheduling results from the scheduling solution base, according to the stream partitioning model, identifying the partition to which the newly-added TT stream belongs, constructing a dynamic scheduling constraint set, designing a heuristic algorithm, conducting incremental scheduling on the newly-added TT stream on a basis of a previous scheduling solution, if there is no feasible scheduling solution, identifying old TT streams belonging to the same partition as the newly-added TT stream, adjusting their scheduling solution until a feasible solution is obtained, and outputting the online scheduling solution;

Step 6: from the online scheduling solution which is output, using associated configuration software, generating configuration files for the switch ports and the terminal devices, configuring them at each of the switches and the terminal devices, storing the online scheduling results in the scheduling solution base, by the scheduling solution base, importing all scheduling result information to the historical information base and updating it.

4. The method of implementing a knowledge inference engine as in claim 3, characterized in that, each of the scheduling instances in the dataset generated in Step 1 possesses a stream with different attributes and an inter-stream dependence graph.

5. The method of implementing a knowledge inference engine as in claim 4, characterized in that, in a partitioning process in Step 2, the higher stream relevance between TT streams, the higher a probability of occurrence of conflicts and dependencies, and the more they tend to be divided into a same partition.

6. The method of implementing a knowledge inference engine as in claim 5, characterized in that, a iterative scheduling algorithm in Step 3 constructs an inter-stream dependency constraint that, assuming there is one child task and one father task in a network, a TT stream of the child task has to be sent in dependence on a TT stream of the father task and an injection time of the child task has to be started only when the father task has arrived, depicting inter-stream dependency characteristics.

7. The method of implementing a knowledge inference engine as in claim 6, characterized in that, the iterative scheduling algorithm in Step 3 constructs an inter-partition scheduling constraint that, according to an iterative scheduling order that has been assigned during the partitioning of the dataset, each partition undergoes, on a basis of partition(s) for which scheduling has been previously completed, scheduling solution generation, improving scheduling scalability.

8. The method of implementing a knowledge inference engine as in claim 7, characterized in that, the online scheduling phase in Step 5 utilizes the offline scheduling results and the offline scheduling solution.

9. The method of implementing a knowledge inference engine as in claim 8, characterized in that, the online scheduling solution in Step 5 employs incremental scheduling for newly-added traffic.

* * * * *